United States Patent
Tabata et al.

(10) Patent No.: US 6,258,008 B1
(45) Date of Patent: Jul. 10, 2001

(54) CONTROL DEVICE FOR RESTARTING ENGINE OF VEHICLE

(75) Inventors: Atsushi Tabata, Okazaki; Shuji Nagano, Toyota, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/377,924

(22) Filed: Aug. 20, 1999

(30) Foreign Application Priority Data

Sep. 14, 1998 (JP) ................................. 10-260204
Mar. 12, 1999 (JP) ................................. 11-066258

(51) Int. Cl.$^7$ ................................. B60K 41/04
(52) U.S. Cl. ................................. 477/107
(58) Field of Search ................................. 477/107

(56) References Cited

U.S. PATENT DOCUMENTS

| | | | |
|---|---|---|---|
| 4,393,964 | * 7/1983 | Kemper | 192/3.58 |
| 5,146,891 | * 9/1992 | Nakazawa et al. | 123/325 |
| 5,216,938 | * 6/1993 | Yamaguchi | 74/866 |
| 5,685,800 | * 11/1997 | Toukura | 477/90 |
| 6,093,974 | * 7/2000 | Tabata et al. | 290/40 R |
| 6,190,284 | * 2/2001 | Kuroda et al. | 477/107 |

FOREIGN PATENT DOCUMENTS

| | | |
|---|---|---|
| 8-14076 | 1/1996 | (JP) . |
| 8-193531 | 7/1996 | (JP) . |
| 9-39613 | 2/1997 | (JP) . |

\* cited by examiner

*Primary Examiner*—Dirk Wright
(74) *Attorney, Agent, or Firm*—Oblon, Spivak, McClelland, Maier & Neustadt, P.C.

(57) ABSTRACT

A control device for restarting an engine of vehicle wherein determination is made on whether a quick pressure increase control is executable. When the quick pressure increase control is determined to be non-executable, the engine torque is reduced as compared to a case where the quick pressure increase control is executable. Further, the engine torque is set at a value when the engine speed is equivalent to an idle speed. Also, when the engine torque is reduced, the brake pressure hold electromagnetic valve is maintained at a hold state. This reduces an engagement shock upon engagement of the clutch and prevents the deterioration of clutch durability, in the case where the quick pressure increase control immediately after restart of the engine is non-executable.

20 Claims, 11 Drawing Sheets

FIG. 4

|   | C0 | C1 | C2 | B0 | B1 | B2 | B3 | B4 | F0 | F1 | F2 |
|---|---|---|---|---|---|---|---|---|---|---|---|
| P | ○ |  |  |  |  |  |  |  | ○ |  |  |
| R(stopped) | ○ |  | ○ |  |  |  |  | ○ | ○ |  |  |
| R(running) |  |  | ○ | ○ |  |  |  | ○ |  |  |  |
| N | ○ |  |  |  |  |  |  |  | ○ |  |  |
| 1st | ○ | ○ |  |  |  |  |  | △ | ○ |  | ○ |
| 2nd | △ | ○ |  |  |  |  | ○ |  | ○ |  |  |
| 3rd | ○ | ○ |  |  | △ | ○ |  |  | ○ | ○ |  |
| 4th | ○ | ○ | ○ |  |  | ⊗ |  |  | ○ |  |  |
| 5th |  | ○ | ○ | ○ |  | ⊗ |  |  |  |  |  |

CONTROL DEVICE FOR RESTARTING ENGINE OF VEHICLE

INCORPORATION BY REFERENCE

The disclosures of Japanese Patent Application Nos.HEI 10-260204 filed on Sep. 14, 1998 and HEI 11-66258 filed on Mar. 12, 1999 including the specification, drawings and abstract are incorporated herein by reference in its entirety.

BACKGROUND OF THE INVENTION

1. Field of the invention

The present invention relates to a vehicle in which an engine is automatically stopped when predetermined engine stop conditions are met and restarted when predetermined restart conditions are met, and more particularly to a control device of the vehicle for restarting the engine by engaging a predetermined clutch of an automatic transmission upon restarting.

2. Description of the Related Art

For example, as a related art, Japanese Patent Application Laid-Open No. HEI8-193531 discloses a vehicle wherein if the vehicle stops running and predetermined engine stop conditions are met, an engine is stopped automatically so as to save fuel, reduce exhaust emission, attenuate noise or the like. In such a vehicle, if predetermined engine restart conditions are met when a driver shows the intention of driving the vehicle by depressing an accelerator pedal, the engine is restarted immediately.

In a vehicle in which a hydraulic automatic transmission is installed, if an engine is stopped, an oil pump coupled to the engine is also stopped. For this reason, for example, oil that has been supplied to a forward clutch of the automatic transmission leaks out from an oil passage, thereby causing a drop in hydraulic pressure. Therefore, in restarting the engine, the forward clutch, which should be engaged during a forward running state of the vehicle, is still disengaged. In such case, unless the forward clutch is promptly engaged when the engine is restarted, the accelerator pedal is depressed, as it were, in a neutral state. Therefore, the forward clutch is engaged when the engine is at a high engine speed, whereby an engagement shock is caused. As a result, the amount of work done by the clutch increases, which may adversely affect the durability of the clutch.

Accordingly, in order to prevent such condition, a technique is proposed by the aforementioned Japanese Patent Laid-Open No. HEI 8-14076 wherein a large-sized accumulator functions to maintain the forward clutch in an engaged state until the engine which has been automatically stopped is restarted. Further, Japanese Patent Laid-Open No. HEI 9-39613 discloses a technique in which, rather than stopping the engine operation completely, the fuel supply to the engine is stopped but the engine speed is kept at an idle speed by a motor generator, such that the operation of the oil pump is not stopped.

However, the technique disclosed in Japanese Patent Laid-Open No. HEI 8-14076 in which the forward clutch is kept in an engaged state with a large-sized accumulator when the engine is stopped could not eliminate other disadvantage due to the accumulator, such as deterioration of a drain performance during shifting from a D (drive) position to an N (neutral) position, that is, retarding of the releasing speed of the forward clutch, or enlarging of the hydraulic control device, for example. Further, the technique disclosed in Japanese Patent Laid-Open No. HEI 9-39613, wherein the engine is maintained at an idle speed by a motor generator is able to reduce the fuel consumption. However, it demands a larger battery (larger capacity) because driving by the motor generator involves significant battery consumption.

SUMMARY OF THE INVENTION

The present invention has been made in the light of the aforementioned drawbacks, and it is an object of the present invention to provide a control device for restarting a vehicle wherein a predetermined clutch of a transmission to be engaged when restarting the engine is engaged without causing engagement shock, without giving rise to other disadvantages such as requiring larger battery or hydraulic control device, while preventing the deterioration of the clutch durability.

According to a first aspect of the present invention, the aforementioned drawback is eliminated by providing a control device for restarting engine of vehicle. The control device comprises an engine restart device, a predetermined clutch, a hydraulic control device, determination device and a torque-down control device. The engine restart device is connected to the engine so as to restart the engine when the engine is stopped and predetermined restart conditions are met. The predetermined clutch is engaged by oil supplied to the clutch and is connected to the engine so as to transmit torque outputted from the engine. The hydraulic control device is connected to the predetermined clutch so as to execute quick pressure increase control which quickly supplies oil temporarily to the clutch at an initial stage of hydraulic pressure supply to the clutch. The determination device determines whether the quick pressure increase control is executable. The torque-down control device reduces the engine torque, as compared to a case where the quick pressure increase control is possible, when it is determined by the determination device that the quick pressure increase control is non-executable.

The "predetermined clutch" referred to herein indicates the clutch which is engaged at the restarting of the engine. It corresponds to a "forward clutch," for example, in a discontinuous variable transmission. Further, the "start clutch," for example, corresponds to the "predetermined clutch" in a continuous variable transmission. In the case of a manual transmission having an automatic clutch, the "automatic clutch" corresponds to the "predetermined clutch."

Also, the "quick pressure increase control" referred to herein, indicates the controlling of the oil supply speed (hydraulic pressure increase) when supplying oil to a predetermined clutch such that the speed is faster than in an ordinary supply. To increase the oil supply speed, such methods as setting a higher control target for the line pressure or enlarging the throttle of the oil passage, for example, may be adopted.

In the present invention, to solve the above-mentioned drawbacks, neither a large-sized accumulator is provided nor is the predetermined clutch maintained in an engaged state by rotating the engine even when the vehicle is stopped. Instead a hydraulic pressure supply for engaging a predetermined clutch is started upon engine restart.

To avoid delay at takeoff, it is necessary to engage the predetermined clutch as quickly as possible when supplying hydraulic pressure. Therefore, the aforementioned quick pressure increase control is executed. However, in the case where this quick pressure increase control is non-executable for some reason, a state may occur where the engagement of a predetermined clutch is not performed on time.

Especially when the accelerator pedal had been depressed, the engagement of the predetermined clutch is further delayed with respect to the engine start. As a result, the clutch is engaged at a high engine speed, possibly leading to a wear of the predetermined clutch and a heavy engagement shock.

Therefore, in the present invention, the engine torque is reduced (torque-down control) when the quick pressure increase control is non-executable for some reason (later explained in detail) as compared to the case where the quick pressure increase control is executable. This reduces the amount of work involved at the time of clutch engagement, thus preventing the deterioration of clutch durability.

When to terminate the torque-down control is not specifically provided. However, such terminating conditions as 1) detection of the clutch engagement completion, and 2) lapse of time predicted of engagement completion are adopted depending on the purpose.

There are many possible specific methods for reducing the engine torque. Of those methods, the easiest to implement is, for example, retarding the ignition timing by an uniform predetermined amount.

Also, the engine torque may be reduced by monitoring the engine speed, for example, and changing the method of reducing the engine torque or the reduction rate of the engine torque depending on the engine speed or its change rate. For example, there may be a method wherein the engine torque is not reduced (or the reduction rate is lowered), particularly until the engine speed reaches the idle speed, and the increase in the engine torque is inhibited when the engine speed tends to exceed the idle speed.

Also, in a vehicle employing a motor generator, for example, the engine speed can be controlled more delicately and with good responsiveness by controlling the engine speed with a motor generator having good response performance.

Preferably, in the case where the quick pressure increase control is non-executable, the engine torque may be changed to and maintained at the torque at a value when the engine speed is equivalent to the idle speed upon engaging a predetermined clutch. That is, by setting a specific value (target value) at which the torque is reduced, the clutch can be engaged with only a minimum torque generated, without the restopping of the engine due to torque reduction. Also, because this method only requires maintaining the throttle at an open state, the monitoring of the engine speed is not necessary, which reduces the exhaust emission at the same time.

Further, braking force maintaining means for maintaining the braking force of a vehicle may be provided such that the braking force is maintained until the clutch is engaged in the case where the engine is restarted in a state with reduced torque. This allows a vehicle to be securely maintained in a stopped state (even on a slope), also allowing a smooth takeoff after clutch engagement.

BRIEF DESCRIPTION OF THE DRAWINGS

The foregoing and further objects, features and advantages of the present invention will become apparent from the following description of preferred embodiments with reference to the accompanying drawings, wherein like numerals are use to represent like elements and wherein:

FIG. 4 is a chart showing an engagement state of a frictional engagement device in the mentioned automatic transmission at each shift position;

DETAILED DESCRIPTION OF THE PREFERRED EMBODIMENTS

Hereinafter, an embodiment of the present invention will be described with reference to the accompanying drawings.

Figure 2:
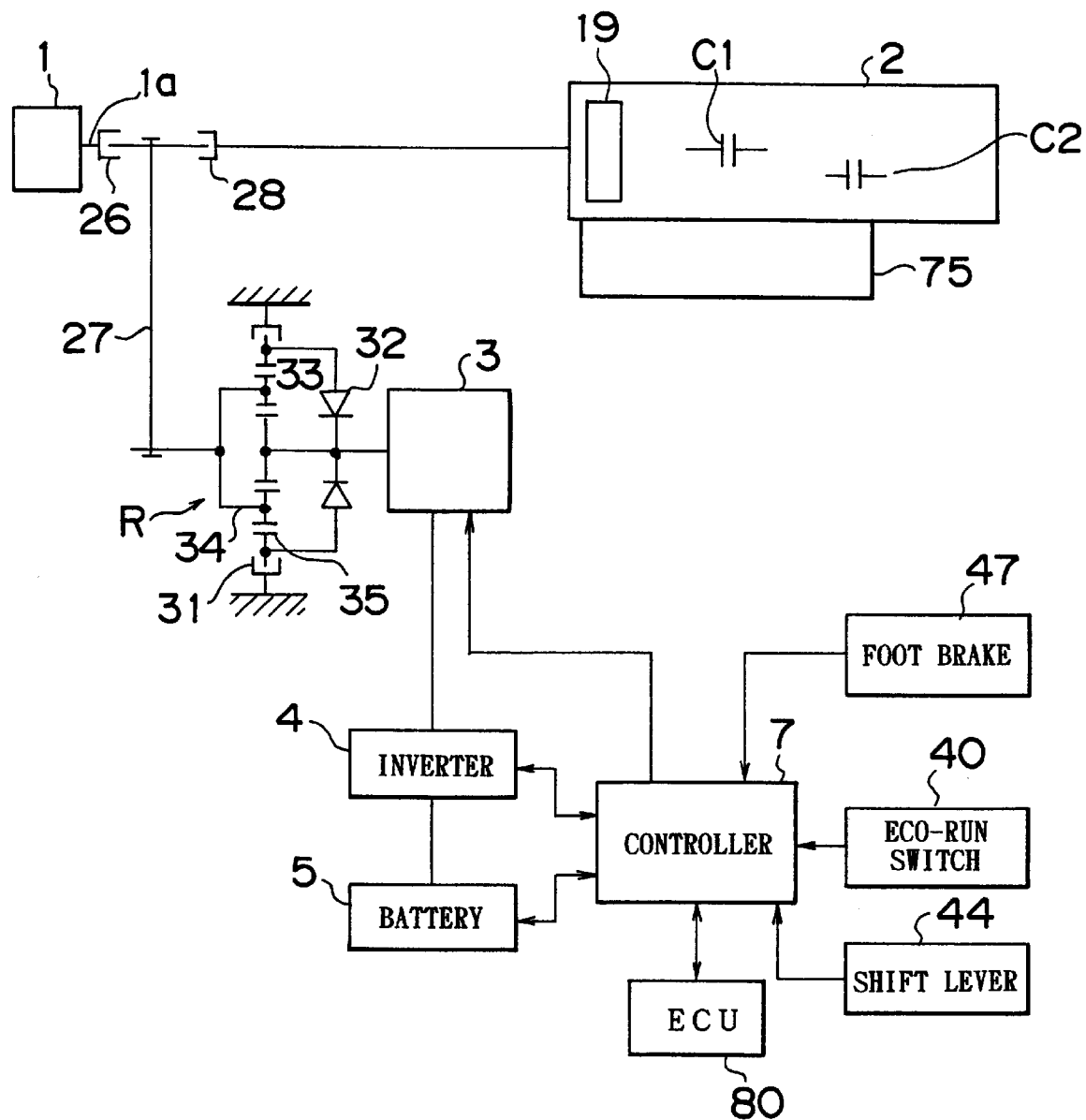
FIG. 2 is a block diagram representing the system construction of an engine drive device for a vehicle to which the present invention is applied.

The embodiment is structured to automatically stop an engine when predetermined stop conditions are met, and restart the engine when predetermined restart conditions are met in a drive system for a vehicle shown in FIG. 2. Especially at the time of engine restart, when the quick pressure increase control (explained later in detail) executed for engaging a predetermined clutch (forward clutch) as quickly as possible is non-executable, the engine torque is reduced to a value less than the amount corresponding to the accelerator depression amount for the protection of the clutch and prevention of an engagement shock.

Referring to FIG. 2, an engine 1 and an automatic transmission 2 are installed in a vehicle. A motor generator (MG) 3 which functions as a motor for restarting the engine 1 and as a generator, is coupled to a crank shaft 1a of the engine via a clutch 26, a chain 27 and a deceleration mechanism R. Further, an engine starter is provided separately from the motor generator 3. At the time of engine start, both the starter and the motor generator 3 may be used, or at an extremely low temperature, the starter may be used exclusively.

The decelerating mechanism R is of a planetary gear type and includes a sun gear 33, a carrier 34 and a ring gear 35. The decelerating mechanism R is interposed between the motor generator 3 and a clutch 28 via a brake 31 and a one-way clutch 32.

An oil pump 19 for the automatic transmission 2 is directly coupled to the crank shaft 1a of the engine 1 via the clutches 26 and 28. Disposed in the automatic transmission 2 are a known forward clutch C1 that is engaged during a forward running state, a backward clutch C2 that is engaged during a backward running state, and the like.

An inverter 4 is electrically connected with the motor generator 3. By means of a switching operation, the inverter 4 can control a supply of electric energy to the motor generator 3 from a battery 5 serving as a power source so as to change a rotational speed of the motor generator. Further, the inverter 4 can perform a switching operation so as to charge the battery 5 with electric energy from the motor generator 3.

A controller 7 performs the control for engaging and disengaging the clutches 26 and 28 and the control for switching the inverter 4. Signals from an automatic stop running mode (hereinafter referred to as an "eco-run mode") switch 40 and a foot brake switch 47 and shift position signals from a shift lever 44 and the like are inputted to the controller 7. Arrows in the drawing indicate respective signal lines. Further, the controller 7 is linked with an ECU (electronic control unit) 80 that controls the engine, the automatic transmission and the like.

Figure 3:
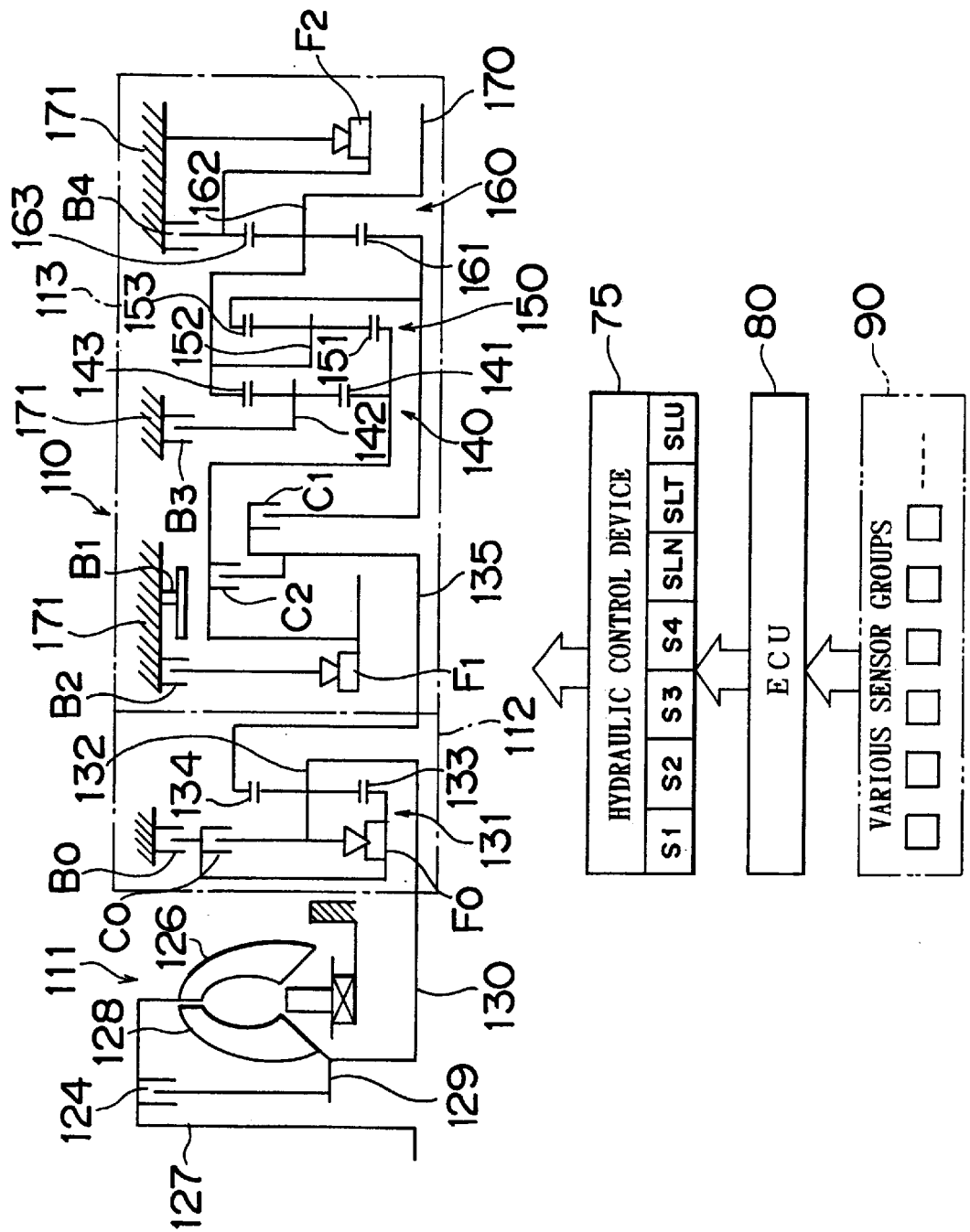
FIG. 3 is a skeleton diagram illustrating an outline of an automatic transmission of the aforementioned vehicle.

A concrete example of an automatic transmission system in the aforementioned automatic transmission 2 will now be described. FIG. 3 is a skeleton diagram of the automatic transmission 2. The automatic transmission 2 is provided with a torque converter 111, a secondary speed-change portion 112 and a primary speed-change portion 113. The torque converter 111 is provided with a lock-up clutch 124. The lock-up clutch 124 is provided between a front cover 127 that is integrated with a pump impeller 126 and a member (hub) 129 to which a turbine runner 128 is integrally attached. The crankshaft 1a of the engine 1 is coupled to the front cover 127. An input shaft 130, which is coupled to the turbine runner 128, is coupled to a carrier 132 of an overdrive planetary gear mechanism 131 constituting the secondary speed-change portion 112.

Provided between a carrier 132 and a sun gear 133 of the planetary gear mechanism 131 are a clutch C0 and a one-way clutch F0. The one-way clutch F0 is engaged when the sun gear 133 rotates positively relative to the carrier 132 (when the sun gear 133 rotates in a rotational direction of the input shaft 130). On the other hand, a brake B0 is provided for selectively stopping rotation of the sun gear 133. Further, a ring gear 134, which is an output element of the secondary speed-change portion 112, is connected with an intermediate shaft 135, which is an input element of the main speed-change portion 113.

In the secondary speed-change portion 112, in a state where the clutch C0 or the one-way clutch F0 is engaged, the entire planetary gear mechanism 131 rotates integrally. Thus, the intermediate shaft 135 rotates at the same speed as the input shaft 130. Further, in a state where the sun gear 133 is stopped from rotating by engaging the brake B0, the ring gear 134 is increased in speed relative to the input shaft 130 and rotates positively. That is, a two-stage switching operation between high and low stages can be set in the secondary speed-change portion 112.

The aforementioned main speed-change portion 113 is provided with three sets of planetary gear mechanisms 140, 150 and 160. These planetary gear mechanisms 140, 150 and 160 are coupled to one another as follows. That is, a sun gear 141 of the first planetary gear mechanism 140 is integrally coupled to a sun gear 151 of the second planetary gear mechanism 150. Besides, a ring gear 143 of the first planetary gear mechanism 140, a carrier 152 of the second planetary gear mechanism 150 and a carrier 162 of the third planetary gear mechanism 160 are coupled to one another. Further, an output shaft 170 is coupled to the carrier 162 of the third planetary mechanism 160. Furthermore, a ring gear 153 of the second planetary gear mechanism 150 is coupled to a sun gear 161 of the third planetary gear mechanism 160.

In a gear train of the main speed-change portion 113, one backward stage and four forward stages can be set, and clutches and brakes therefor are provided as follows. Namely, the forward clutch C1 is provided between the intermediate shaft 135, on one hand, and the ring gear 153 of the second planetary gear mechanism 150 and the sun gear 161 of the third planetary gear mechanism 160 on the other hand. Further, a clutch C2 that is engaged on the backward stage is provided between the intermediate shaft 135 on one hand and the sun gear 141 of the first planetary gear mechanism 140 and the sun gear 151 of the second planetary gear mechanism 150 on the other hand.

A brake B1 is disposed to stop rotation of the sun gear 141 of the first planetary gear mechanism 140 and the sun gear 151 of the second planetary gear mechanism 150. Further, a one-way clutch F1 and a brake B2 are arranged in series between the sun gear 141 and 151 and a casing 171. The one-way clutch F1 is engaged when the sun gears 141 and 151 are about to rotate reversely opposite to a rotational direction of the input shaft 135).

A brake B3 is provided between a carrier 142 of the first planetary gear mechanism 140 and the casing 171. Further, a brake B4 and a one-way clutch F2, which are elements for stopping a ring gear 163 of the third planetary gear mechanism 160, are arranged in parallel and opposite to the casing 171. The one-way clutch F2 is engaged when the ring gear 163 is about to rotate reversely.

As a result, the aforementioned automatic transmission 2 is capable of performing speed-change operations among one backward stage and five forward stages.

FIG. 4 shows an engagement operation chart of respective clutches and brakes (frictional engagement devices) for setting these speed-change stages. Referring to FIG. 4, o represents an engagement state, Δ represents an engagement state that is established only when engine brake should be ensured, ⊗ represents an engagement state that is established regardless of power transmission, and a blank represents a release state. When shifting from ordinary "N" position to a first in the "D" position, it is necessary to supply oil to the clutch C1 only, because the oil passage (especially, the oil passage leading to a manual valve explained later) of the line pressure system inside the hydraulic control device is already filled with oil. However, when shifting from the state at which the engine 1 is stopped, to the first in "D" position by restarting, the oil is drained from the line pressure system, and moreover, the clutch C0 has to be engaged simultaneously. This makes the execution of the "quick pressure increase control" for supplying oil quickly particularly at the initial supply of oil effective.

Furthermore, in the case with manual mode, engagement of the brake B4 is further required to make engine braking securable, when in the "first" position. Similarly, when taking off in a "second" position or a "third" position, the types and numbers of clutches and brakes engaged differ between ordinary running state and when ensuring engine braking. Therefore, the amount of oil supplied should be increased according to the number of engaged clutches when implementing the quick pressure increase control.

Figure 5:
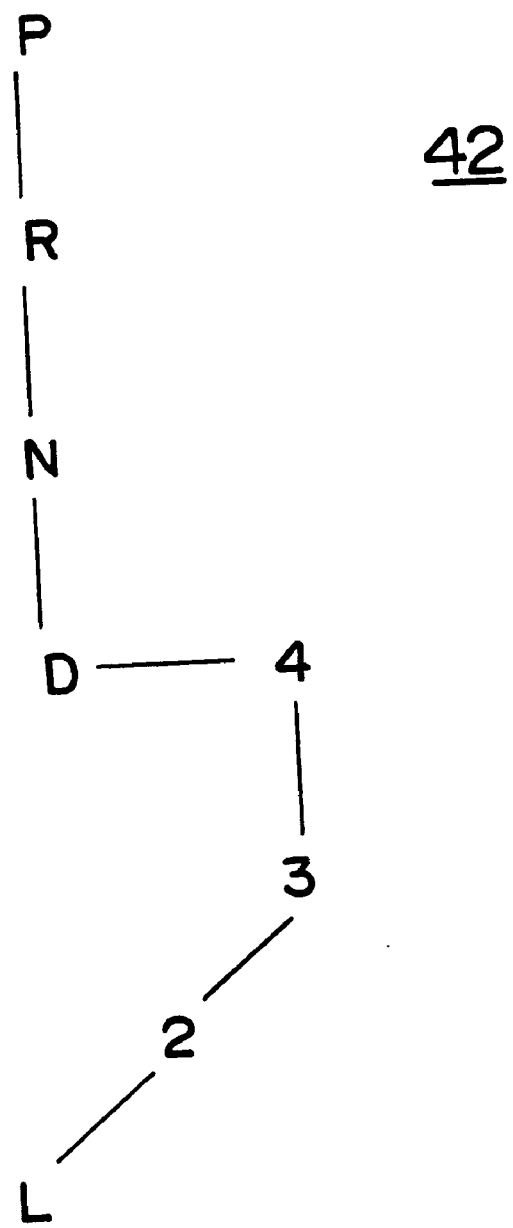
FIG. 5 is a diagram illustrating a shift position arrangement of a gate position of a shift lever.

In the case where the first position is avoided due to a solenoid fail (failure) or a valve stick at takeoff, and the takeoff is controlled to be conducted at a high gear (mainly second), the amount of oil supplied will be for the high speed gear (second). FIG. 5 illustrates a shift position arrangement switched by a shift lever 42. Starting from the top, a "P (parking)," a "R (reverse)," a "N (neutral)" and a "D (drive)" are disposed in this order. To the right of the position "P," a "4" position for manual mode is disposed. Following the "4" position is a "3" position, a "2" position and an "L" (low) position for manual shifting disposed in this order toward the driver. When the shift lever is moved to the "4," "3" and "2" positions of the manual mode, the automatic transmission is locked at the fourth (4th), third (3rd) and second (2nd) gear, respectively.

Referring back to FIG. 3, solenoid valves S, S2, S3, S4, SLN, SLT and SLU in a hydraulic control device 75 are controlled based on instructions from the ECU (electronic control unit) 80, whereby the respective clutches and brakes (frictional engagement devices) are engaged or released.

It is to be noted herein that S1, S2 and S3 denote solenoid valves for shifting operation, S4 denotes a solenoid valve for engine brake operation, SLN denotes a solenoid valve for controlling back pressure of an accumulator, SLT denotes a solenoid valve for controlling line pressure, and SLU denotes a solenoid valve for lock-up operation. The ECU 80 is linked with the controller 7 for the aforementioned motor generator 3. Signals from various sensor groups 90 are inputted to the ECU 80, which then controls the solenoid valves and the like, so that respective clutches and brakes (frictional engagement devices) can be engaged or released.

Figure 6:
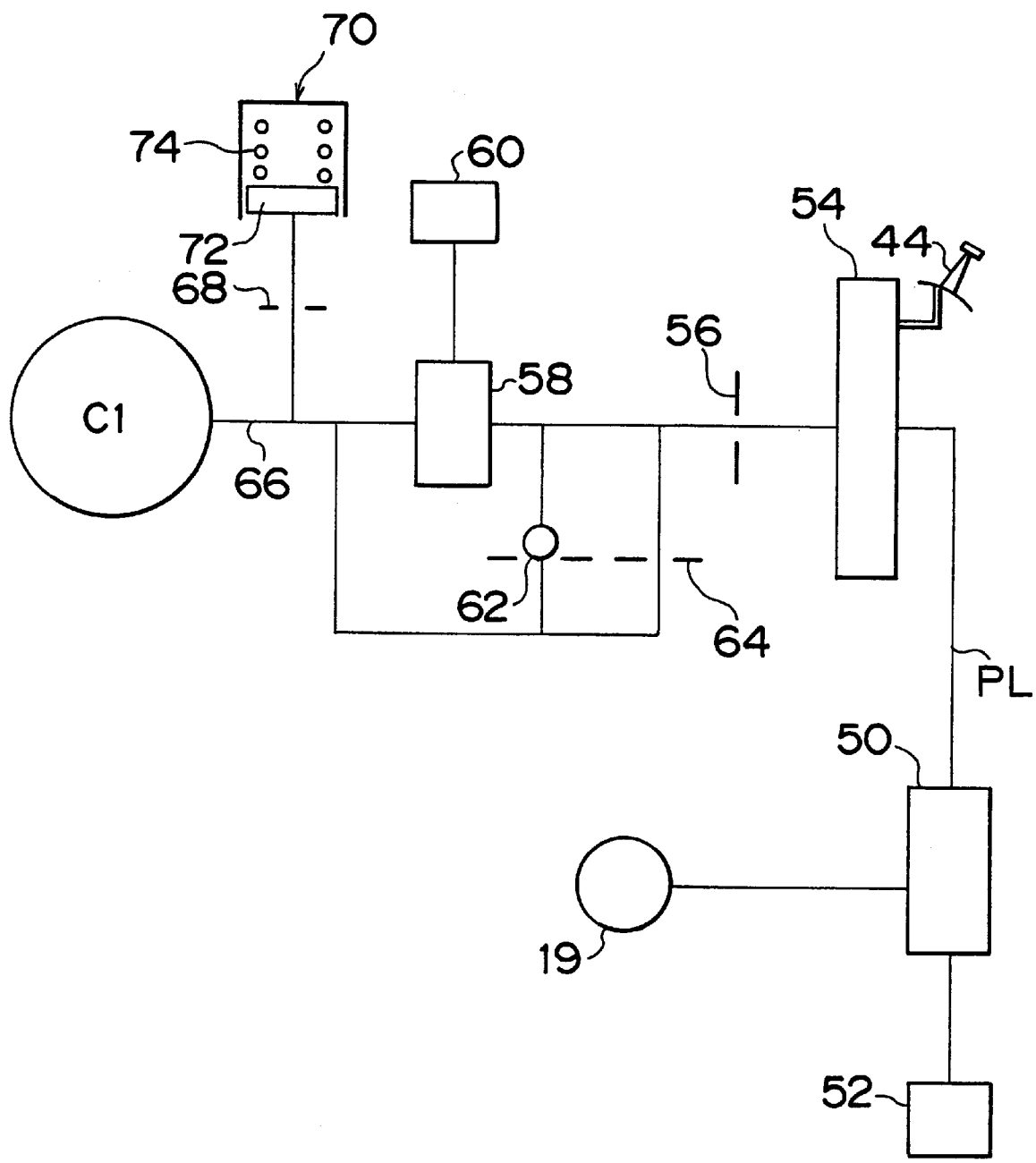
FIG. 6 is a hydraulic circuit showing essential portions of a hydraulic control device for executing a quick pressure increase control out of the controls employed in the embodiment.

A construction for engaging the forward clutch C1 in the above-mentioned automatic transmission 2 will now be described. FIG. 6 is a hydraulic circuit diagram showing an essential part of the construction for engaging the forward clutch C1 in the hydraulic control device 75 of the automatic transmission. Because the same construction can also be applied to the backward clutch C2, the description thereof will be omitted.

A line pressure control solenoid 52 controls a primary regulator valve 50, which adjusts the pressure generated by the oil pump 19 to a line pressure PL. The line pressure PL is transmitted to a manual valve 54. The manual valve 54 is mechanically connected with a shift lever 44. In this case, the manual valve 54 transmits the line pressure PL to the forward clutch C1 when a forward position such as a D-position, a first (L) or second manual positions or the like is selected.

A large orifice 56 and a switching valve 58 are interposed between the manual valve 54 and the forward clutch C1. A solenoid 60 controls the switching valve 58, which then selectively supplies oil that has passed through the large orifice 56 to the forward clutch C1 or shuts the oil off.

Bypassing the switching valve 58, a check ball 62 and a small orifice 64 are arranged in parallel. When the switching valve 58 is shut off by the solenoid 60, the oil that has passed through the large orifice 56 reaches the forward clutch C1 via the small orifice 64. The check ball 62 functions such that hydraulic fluid in the forward clutch C1 is drained smoothly.

An accumulator 70 is disposed in an oil passage 66 between the switching valve 58 and the forward clutch C1 via the orifice 68. The accumulator 70, which is provided with a piston 72 and a spring 74, functions such that when oil is supplied to the forward clutch C1, a certain hydraulic pressure determined by the spring 74 is maintained for a while. Thus, the accumulator 70 attenuates a shock generated upon engagement of the forward clutch C1.

Figure 7:
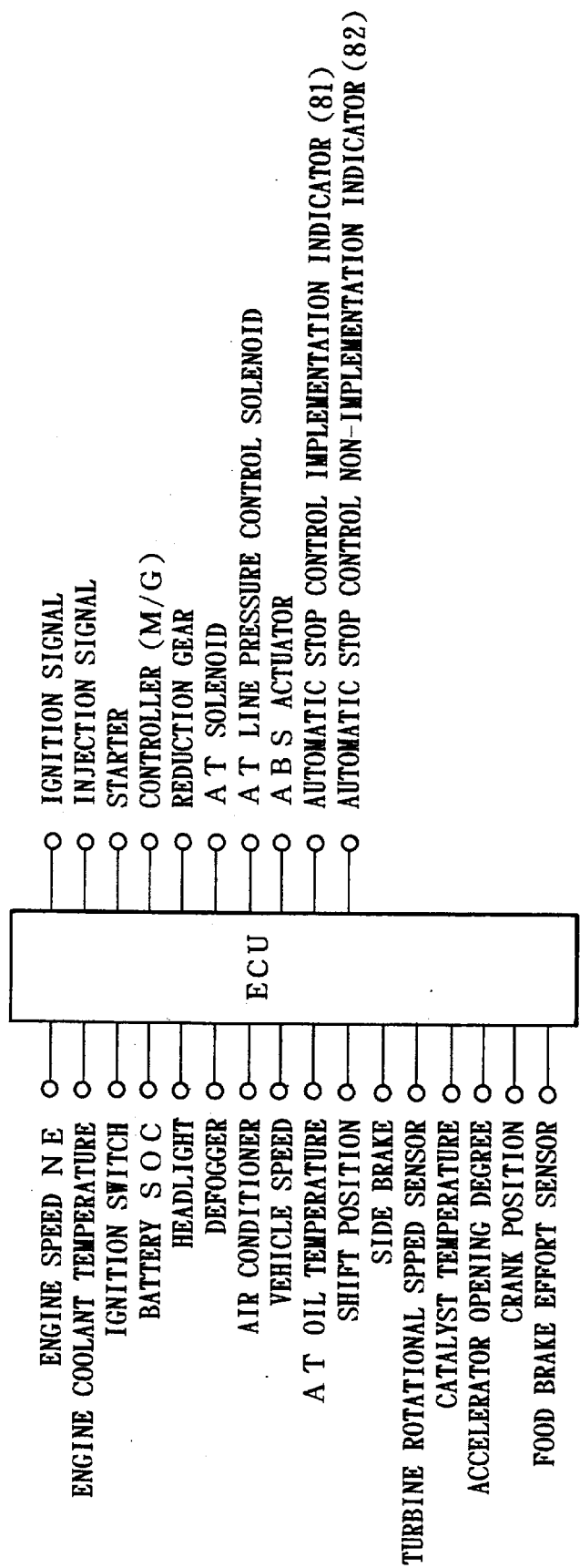
FIG. 7 is a diagram showing the relationship between the input and output signals with respect to an ECU (electronic control unit) of the embodiment.

FIG. 7 shows how signals are inputted to or outputted from the ECU 80. Various signals shown on the left side of FIG. 7, such as signals regarding an engine speed NE, an engine coolant temperature and a state of an ignition switch, signals regarding an amount SOC (state of charge) of electricity stored in the battery and a state of a headlight, ON/OFF signals of a defogger, ON/OFF signals of an air-conditioner, signals regarding a vehicle speed, an AT oil temperature and a shift position, ON/OFF signals of a parking brake, ON/OFF signals of the foot brake, signals regarding a catalyst temperature and an opening degree of the accelerator pedal, signals regarding a position of the crank shaft, signals from a turbine rotational speed sensor 81 of the torque converter, and the like are inputted to the ECU 80. Also, various signals shown on the right side of the figure, such as ignition signals, injection signals, signals to the starter, the controller 7 for the motor generator, the deceleration mechanism, the AT solenoid, the AT line pressure control solenoid, and the electronic throttle valve are outputted from the ECU 80.

Figure 8:
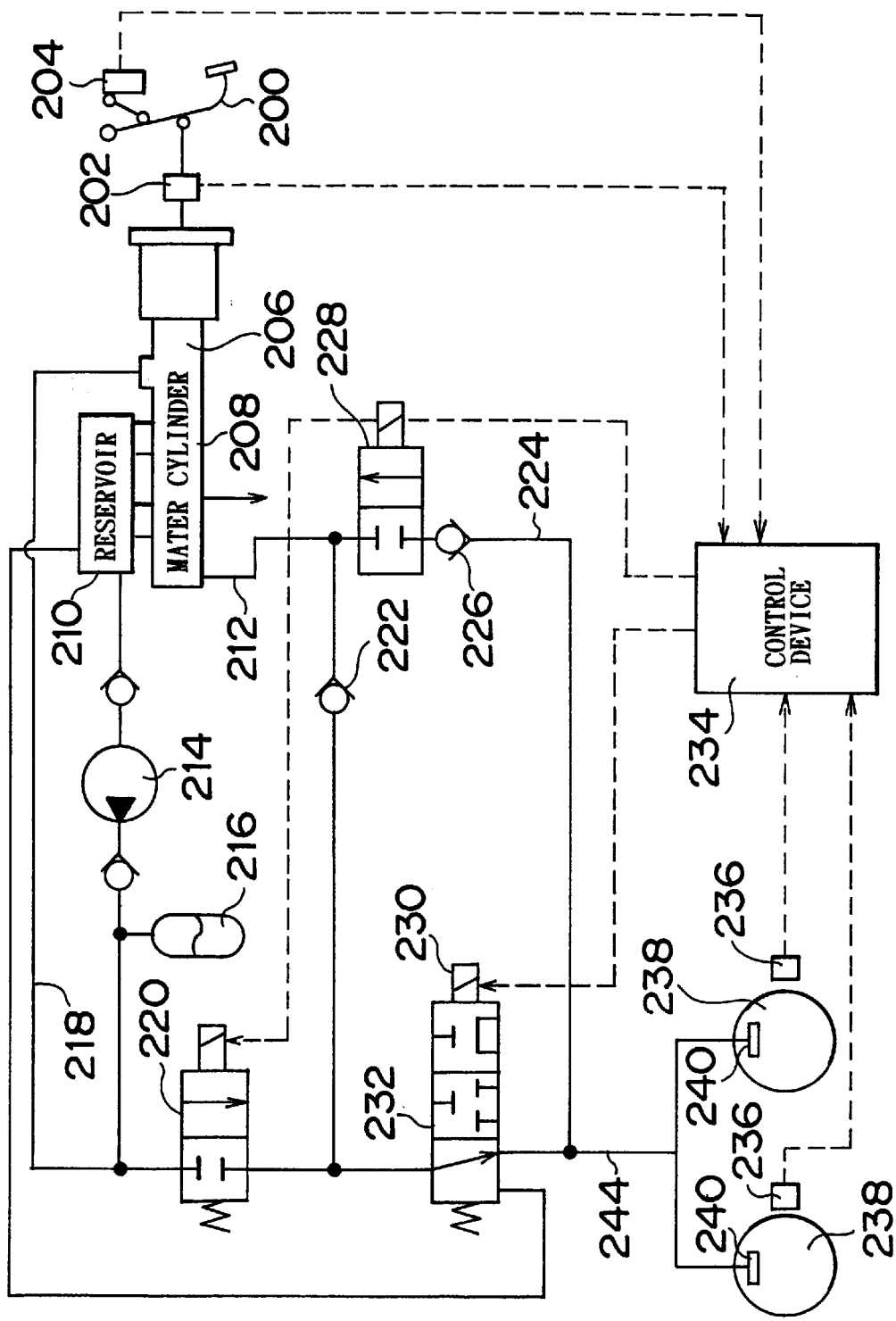
FIG. 8 is a diagram illustrating the brake system.

Next, a brake construction for maintaining a vehicle at a stopped state will be described with reference to FIG. 8. Referring to FIG. 8, a brake pedal 200 is shown as a brake operation member. The brake pedal 200 activates a master cylinder 208 via a hydraulic booster 206. A reservoir 210 is mounted to the top portion of the master cylinder 208. A pump 214 pumps up brake fluid from the reservoir 210 and stores the brake fluid in an accumulator 216 at a high pressure. The aforementioned booster 206 is connected to the accumulator 216 via a fluid passage 218.

A pressurizing chamber, not shown in the drawing, in the master cylinder is connected to a wheel cylinder of a brake which brakes a front wheel 238 via a main fluid passage composed of fluid passages 212 and 244. On the other hand, the pressuring chamber (not shown in the drawing) is connected to a wheel cylinder of a brake which brakes rear wheels. Because the construction of a rear wheel system is the same as that of a front wheel system, figures and explanations thereof will be omitted. Accordingly, only the front wheel system will be described.

A check valve 222 and an electromagnetic pressure increase decrease valve 232 are provided in the fluid passage 212. The electromagnetic pressure increase-decrease valve 232 is ordinarily in a pressure-increase tolerating state for communicating the fluid passage 212 and 244, that is, the master cylinder 208 and the wheel cylinder 240. However, when an electric current of a medium value is supplied to a solenoid 230, the electromagnetic pressure increase-decrease valve 232 is switched to a pressure maintaining state wherein the communication between the master cylinder 208 and the reservoir 210 is shut off. Furthermore, when a heavy current is supplied to the solenoid 230, the electromagnetic pressure increase-decrease valve 232 is switched to a pressure-decrease tolerating state for communicating the wheel cylinder 240 and the reservoir 210. Therefore, the electromagnetic pressure increase-decrease valve 232 is a three-position electromagnetic valve.

A check valve 226 is provided in a bypass passage 224 which bypasses the above-mentioned electromagnetic pressure increase-decrease valve 232. Brake fluid in the wheel cylinder 240 is returned to the master cylinder 208 via the bypass passage 224.

In the bypass passage 224 is provided a brake fluid hold electromagnetic valve 228 for confining the brake fluid in the wheel cylinder 240 when the brakes are applied. The brake fluid hold electromagnetic valve 228 permits such control as applying brakes at a state where the brake pedal 200 is released.

The aforementioned accumulator 216 is connected to the passage 212 at a portion posterior to the check valve 222 thereof via an electromagnetic activated valve 220. The electromagnetic activated valve 220 is ordinarily at a state wherein the communication between the accumulator 216 and the fluid passage 212 is shut off. However, the electromagnetic activated valve 220 is opened on starting of the activation of the above-mentioned electromagnetic pressure increase-decrease valve 232, thereby supplying high-pressured brake fluid from the accumulator 216 to the electromagnetic pressure increase-decrease valve 232. The high-pressured brake fluid supplied from the accumulator 216 is prevented from flowing into the master cylinder 208 by the check valve 222.

A rotational speed sensor 236 detects the rotational speed of the front wheel 238, a brake switch 204 detects depressing of the brake pedal 200, a load cell 202 detects an operational force of the brake pedal 200, and a control device 234 controls the brake pressure. The control device 234 is linked to the aforementioned controller 7.

The operation of the present embodiment will be described. Referring to FIG. 2, at the time of engine start, the clutches 26 is engaged, and the motor generator 3 is driven to start the engine 1. (The starter may be used together with the motor generator, or the starter may be used exclusively. However, such cases will not be described). By engaging the brake 31 at this time, the speed of the motor generator 3 stepped down but its torque is multiplied and transmitted from the sun gear 33 to the carrier 34 of the decelerating mechanism R. Thus, even if the power of the motor generator 3 and the inverter 4 are small, a driving force necessary for cranking the engine 1 can be ensured. After the engine 1 has been started, the motor generator 3 functions as a generator. For example, the motor generator 3 stores electric energy in the battery 5 in braking the vehicle.

At the time of engine start, the controller 7 detects a rotational speed of the motor generator 3 and outputs a switching signal to the inverter 4 such that the motor generator 3 achieves torque and rotational speed that are necessary to start the engine 1. For example, if the air-conditioner is on at the time of engine start, a larger torque is required in comparison with the case where the air-conditioner is off. Hence, the controller 7 outputs a switching signal such that the motor generator 3 can rotate with large torque and at a high rotational speed.

If the predetermined engine stop conditions are met when an eco-run mode signal is on, the controller 7 outputs a signal for cutting fuel supply to the engine 1, thereby automatically stopping the engine. The eco-run mode signal is inputted to the controller 7 when a driver presses an eco-run switch 40 provided in a vehicle compartment.

The conditions for automatically stopping the engine 1 according to the present embodiment are "the vehicle speed is zero," "the accelerator is off," "the brake is on," and "the shift position is a non-driving position." Furthermore, the engine 1 is not stopped automatically until "a predetermined time Tstop has lapsed continuously under these conditions." The predetermined time Tstop is counted by a timer, and is inputted to the controller 7 and the ECU 80 for processing.

Further, the predetermined time Tstop corresponds to the time elapsed before the automatic stopping of the engine is started. Therefore, it is possible to change the predetermined time Tstop according to the situation and setting it to that value. By setting the predetermined time Tstop to zero, the engine may be stopped automatically immediately after the predetermined stop conditions are met. Also, the predetermined time Tstop may be set to infinity so as to substantially prohibit the automatic stopping of the engine.

After the automatic stopping of the engine 1, the controller 7 outputs control signals for disengaging the electromagnetic clutch 26. Therefore, the chain 27 and the engine 1 are in a power non-transmitted state. On the other hand, to keep the air conditioner and the power steering unit activated even when the engine 1 is stopped, the controller 7 outputs corresponding switching signals to the inverter 4 such that the motor generator 3 rotates at a torque taking into consideration the load or the like of a compressor for the air conditioner.

Figure 9:
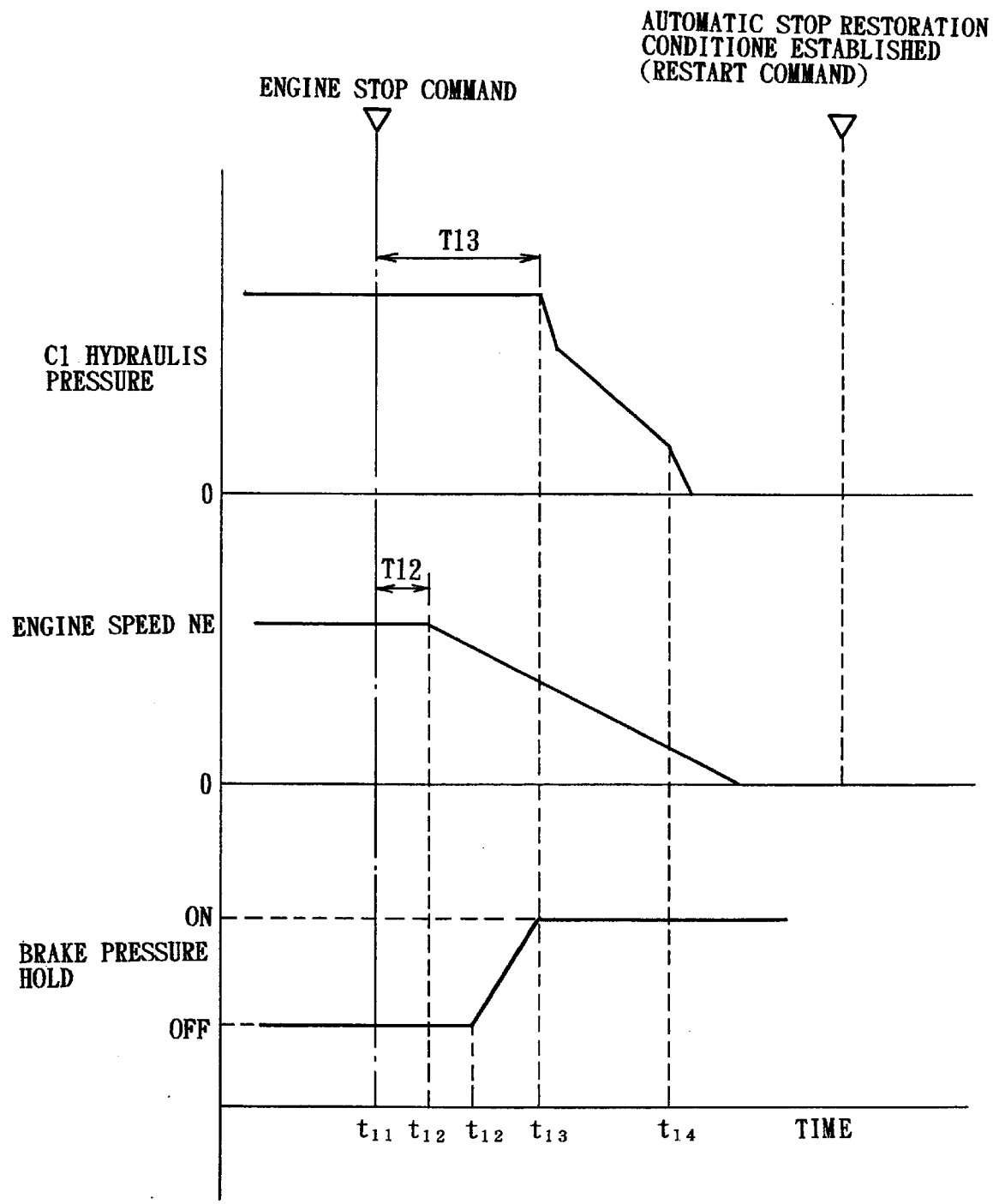
FIG. 9 is a diagram illustrating the relationship between the hydraulic pressure of a forward clutch C1, engine speed NE, and hold state of the brake pressure after an engine stop command.

FIG. 9 shows the hydraulic pressure of the forward clutch C1, the engine speed NE, and the hold state of the brake pressure after a command for stopping the engine 1 is given. When the engine stop command is given at time t11, the engine speed NE starts decreasing from time t12 with a certain delay T12. On the other hand, the drain characteristic of the forward clutch C1 is such that the hydraulic pressure is maintained at a same state (even if the rotational speed of the oil pump 19 were to drop as in the case with the engine speed NE) for a longer time T13 after the command for stopping the engine 1 is given at time t11, and the hydraulic pressure rapidly drops from time t13. After the engine stop command is given, because no line pressure PL is generated, the hydraulic pressure of the forward clutch, the brake hydraulic pressure and the like will be released.

Therefore, in the present embodiment, after the engine automatic stop command is given, the brake pressure hold electromagnetic valve 228, explained with reference to FIG. 8, is activated at time t12' before the brake hydraulic pressure is released. By holding (confining) the brake pressure, it is possible to maintain the brakes at applied state even when the brake pedal 200 is released.

Next, the operation of quick engagement with a small engagement shock of the forward clutch C1 upon restarting the engine 1 from its automatically stopped state with an appropriate quick pressure increase control will be described. Then the engine is restarted when predetermined restart conditions are met (automatic restoration of the engine). The predetermined restart conditions are met, for example, when any of the stop conditions "vehicle speed is zero," "the accelerator is off," "the brake is on," "the shift position is at a non-driving position" is not met. Aside from this, the engine is automatically restored when the state of charge SOC of the battery has become low.

In the present embodiment, the mode is switched to the eco-run mode when the shifting position is at a non-driving position, and the eco-run mode is terminated when it is detected that the shifting position has been changed to a driving position. However the scope of the present embodiment is not limited to this, and the system may be such that the eco-run is implemented at the driving position only, or the eco-run is implemented at both the driving position and the non-driving position.

Referring to FIG. 6, the oil pump 19 starts rotating when the engine is restarted, and oil is supplied to the primary regulator valve 50. The line pressure adjusted by the primary regulator valve 50 is finally supplied to the forward clutch C1 via the manual valve 54. The present embodiment adopts a system wherein the oil supplied to a predetermined clutch at the initial stage is quickly supplied temporarily so as to engage the clutch as quickly as possible (quick pressure increase control).

First, the case wherein the quick pressure increase control can be normally implemented will be described. When the solenoid 60 is controlling the switching valve 58 at an open state in accordance with the command to implement the quick pressure increase control from the controller 7, the line pressure PL which has passed through the manual valve 54 passes through the large orifice 56, then the line pressure PL is directly supplied to the forward clutch C1. Further, at this stage where the quick pressure increase control is executed, the accumulator 70 does not function due to the setting of the spring constant of the spring 74.

Then the solenoid 60 shut-off controls the switching valve 58 upon receiving from the controller 7 a command for terminating quick pressure increase control, the line pressure which has passed through the large orifice 56 is supplied to the forward clutch C1 comparatively slowly via a small orifice 64 (substantially the same route as a conventional route). Also, at this stage, the hydraulic pressure supplied to the forward clutch C1 is high. Accordingly, the hydraulic pressure of the oil passage 66, which is connected to the accumulator 70, moves the piston 72 upward as shown in the figure against the spring 74. As a result, the increase in the hydraulic pressure supplied to the forward clutch C1 slackens while the piston 72 is moving, thereby enabling a significantly smooth engagement of the forward clutch C1.

Figure 10:
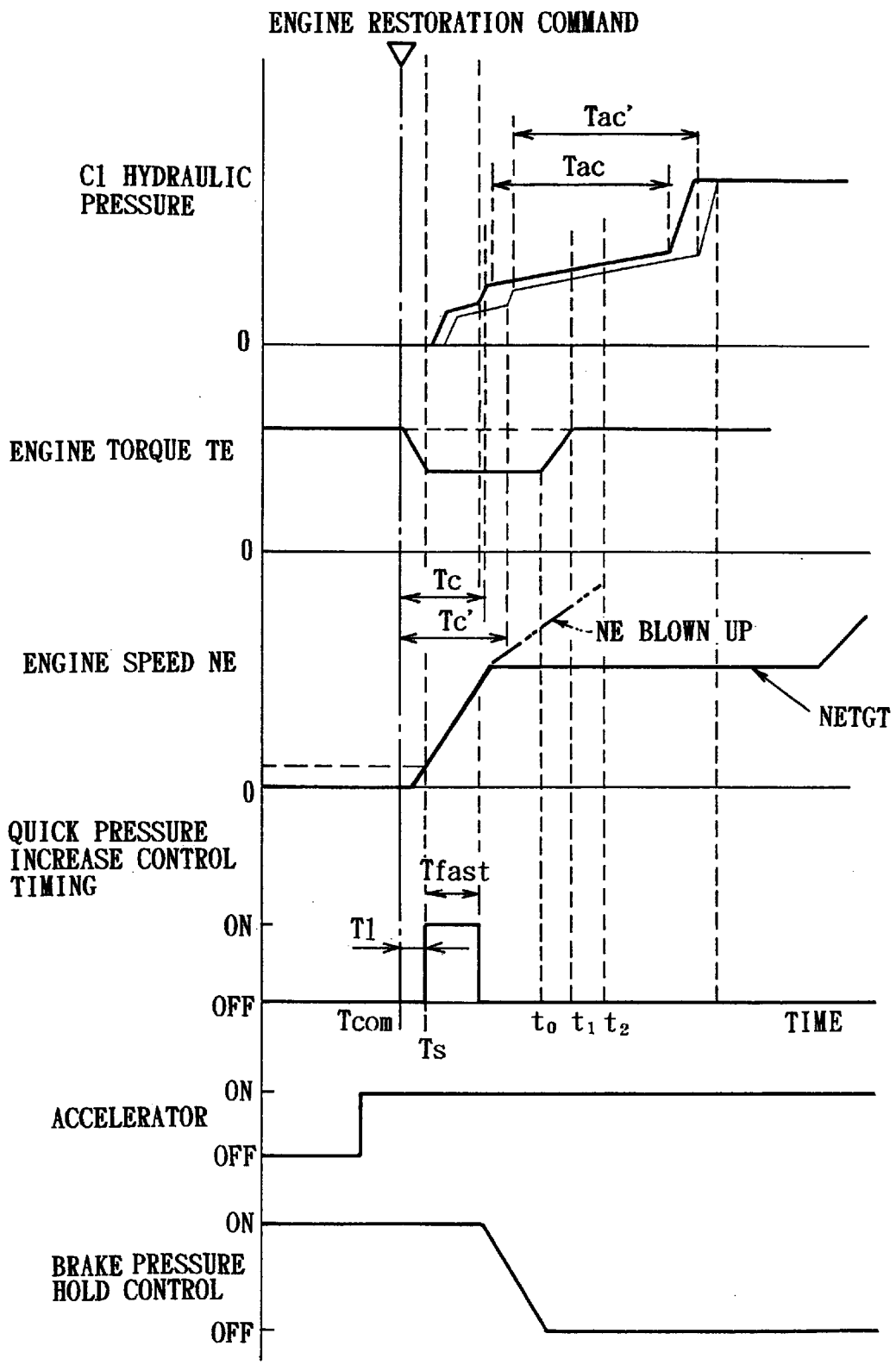
FIG. 10 is a diagram illustrating the supply characteristics and engine torque NE, etc., of the forward clutch according to the embodiment taken along the time axis.

FIG. 10 shows the hydraulic pressure supply characteristics of the forward clutch C1, the engine torque TE, the engine speed NE, the quick pressure increase control timing, and the control of accelerator signals and brake pressure hold. In FIG. 10, a portion defined as Tfast indicates a period (a predetermined period) for executing the quick pressure increase control. The period Tfast qualitatively corresponds to a period at which a piston (not shown) of the forward clutch C1 shortens the period for loading a so-called "clutch pack," and the engine revolution corresponds to a period slightly before reaching a predetermined idle speed. Further, the period Tfast is controlled by the timer. Also, in FIG. 10, a thin line shows the characteristic without the quick pressure increase control, Tc and Tc' correspond to a period taken to load the clutch pack of the forward clutch C1, and Tac and Tac' correspond to a period taken while the accumulator 70 functions.

As apparent from FIG. 10, the start timing Ts for the quick pressure increase control is set when the engine revolution (rotational speed of the oil pump 19) NE becomes a predetermined value NE1. The quick pressure increase control is not started concurrently with a restart command Tcom of the engine, because of a possibility that the time T1 taken from the state where the rotational speed of the engine 1 is zero to the state where it slightly starts (to reach the value of about NE1) greatly varies depending on the driving conditions.

When starting the quick pressure increase control concurrently with the restart command Tcom of the engine, the forward clutch C1 will complete the engagement during execution of the quick pressure increase control under the influence of the varying time T1, thus causing a risk of great engagement shock. Therefore, a stable oil supply control with small variation in the time T1 irrespective of the driving conditions can be achieved by avoiding the timing immediately after the engine restart which is greatly influenced by the variation in time T1, and instead adopting a time Ts at which the rotation of the engine slightly starts increasing as a start timing for the quick pressure increase control.

Next, the case wherein the quick pressure increase control cannot be normally implemented will be described. "The case wherein the quick pressure increase control cannot be normally implemented" refers to, for example, the case where a solenoid for controlling the valve in the hydraulic circuit has failed. As mentioned earlier, the solenoid 60 which controls the switching valve 58 is provided for executing the quick pressure increase control, and the quick pressure increase control is executed by the solenoid valve 60 being drivingly controlled according to commands from the ECU (electronic control unit) 80. Therefore, the quick pressure increase control cannot be properly executed when the solenoid 60 fails. When the quick pressure increase control is not properly executed, the engagement of the forward clutch C1 cannot be made in time. This may cause the engine to over-rev (see the broken line of the engine speed NE in FIG. 10), generate a great engagement shock, or accelerate the wear of the forward clutch C1. When the accelerator pedal is depressed by the driver in such state (solenoid fail), the clutch C1 is engaged while the engine torque TE is high. This may lead to a greater engagement shock. Therefore, the present embodiment provides determination in advance on whether the quick pressure increase control can be executed.

The determination on whether the quick pressure increase control can be executed can be made by checking the change in current value when a command is given to the solenoid 60, because failing of the solenoid 60 is the most probable cause for non-executability of the quick pressure increase control. Also, for instance, by having the rise of the turbine rotational speed NT memorized, the failure can be determined by detecting an abnormality occurring in the rise, or by detecting the turbine rotational speed NT real time. Thus, whether the quick pressure control is non-executable for some reason, including the failure of the solenoid 60, can be determined. If it is determined that the quick pressure increase control cannot be normally implemented, the engine torque TE is reduced (torque-down control) in the present embodiment (see FIG. 10).

In the present embodiment, the reduction of the engine torque TE starts on the engine restart command time Tcom. The target for engine torque reduction is changed to and maintained at the value when the engine speed NE is equivalent to the idle speed. The engine torque may also be reduced by "retardation of ignition timing" or "maintaining the throttle closed."

The engine torque TE is also reduced when the engine speed NE has over-revved due to delay in control by accelerator on (engine restart) or the engagement of the forward clutch C1. The over-revving of the engine speed NE can be detected by detecting the change rate DNE of the engine speed NE, and determining whether the change rate DNE is greater than a predetermined value NEA.

Further, to reduce the engine torque TE, the combustion state of the engine may be directly controlled by ignition retardation, for example. Further, the reduction method for the engine torque TE may also include controlling of the engine speed NE by the motor generator 3 (toward suppressing the rotation), which then leads to reduction of the engine torque TE.

Furthermore, the torque-down control of the engine may be implemented together with the reduction control of the engine speed NE by the motor generator 3.

In the case of controlling the engine speed NE upon suppressing the engine torque TE, controlling the engine speed NE by the motor generator 3 having good response performance allows a more delicate and responsive control of the engine torque TE.

The conditions for terminating timing of torque-down may include:
(1) detection of termination of engagement of the clutch C1,
(2) detection of a state immediately before or immediately after the termination of engagement of the clutch C1,
(3) lapse of time estimated to be equivalent to the time of (1) or (2).

The detection of (1) and (2) above may be easily estimated from the turbine rotational speed NT. Further, the start and termination timings of the torque-down control are not limited to the above-mentioned example. The engine torque TE only needs to be reduced during the period before the forward clutch C1 terminates the engagement after the time of engine restart command Tcom or when the quick pressure increase control is determined to be possible (real time). A certain amount of deviation or error is permissible. This allows engagement of the forward clutch at a constantly stable engine torque TE (equivalent to idle speed) in such cases where the accelerator pedal is depressed during engine restart. Accordingly, the forward clutch C1 is never engaged while the engine torque TE is large. As a result, the engagement shock is suppressed and the amount of work done by the clutch is reduced, whereby the durability of the clutch is improved.

Also, in the case of systems achieving a high-speed gear by avoiding the first gear at takeoff with a valve stick, the oil to be supplied to the forward clutch C1 is distributed to the clutch C0 or B3, resulting in a delayed supply of oil to the clutch C1. Therefore, the torque-down control may be executed by determining this state as the state where the quick pressure increase control is non-executable.

Furthermore, during torque-down control in the present embodiment, the brake system, described with reference to FIG. 8, maintains the brake pressure hold electromagnetic valve 228 as it is at a hold state, after the engine stop command is given. That is, the brake pressure is temporarily held (confined) (at time t12' in FIG. 9) after the automatic engine stop command, so that the vehicle does not move (brake pressure hold control).

Further, the completion of the clutch engagement will be the termination of the brake pressure hold control (see FIG. 10). The timing at which the clutch engagement is completed can be determined by the turbine rotational speed.

Also, the timing for terminating the brake pressure hold control may be when a predetermined time Tn, long enough for a driver to activate (depress) the brake, has elapsed. Also, the brake pressure hold control may be synchronized with the termination of the torque-down control.

In this way, the clutch can be protected when the accelerator pedal is depressed while the hydraulic pressure is being supplied to the forward clutch C1 (when the clutch is not completely engaged), for example. Also, in the case where the engagement of the clutch is delayed somewhat, the vehicle can be completely maintained at a stopped state. This prevents the backward movement of the vehicle or the like even when the vehicle is on a slope.

After the termination of the torque-down control, the torque is gradually returned to the ordinary engine torque TE to avoid a drastic change.

Figure 1:
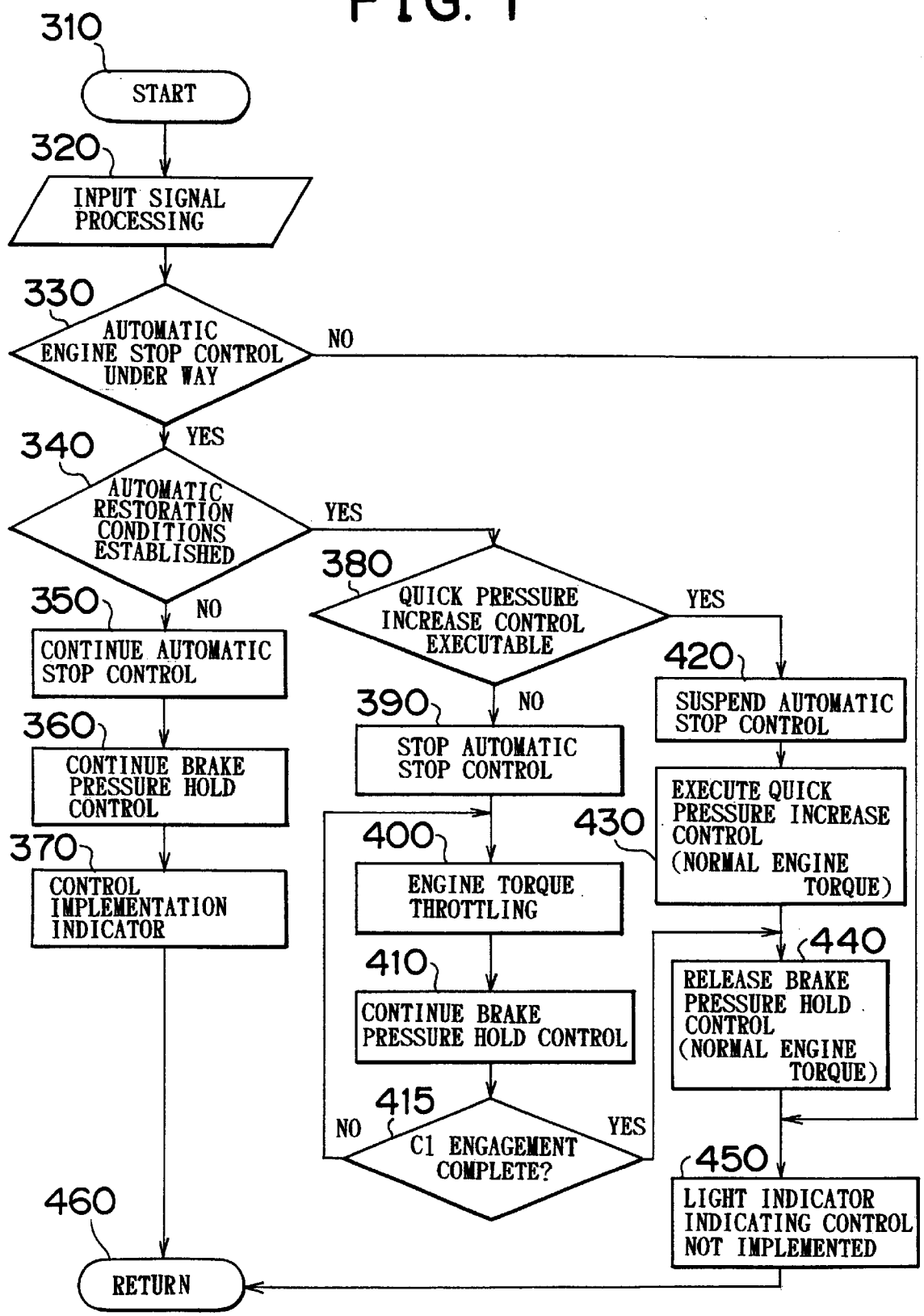
FIG. 1 a flow chart showing an example of the control implemented in an embodiment of an engine stop control of a vehicle according to the present invention.
Figure 11:
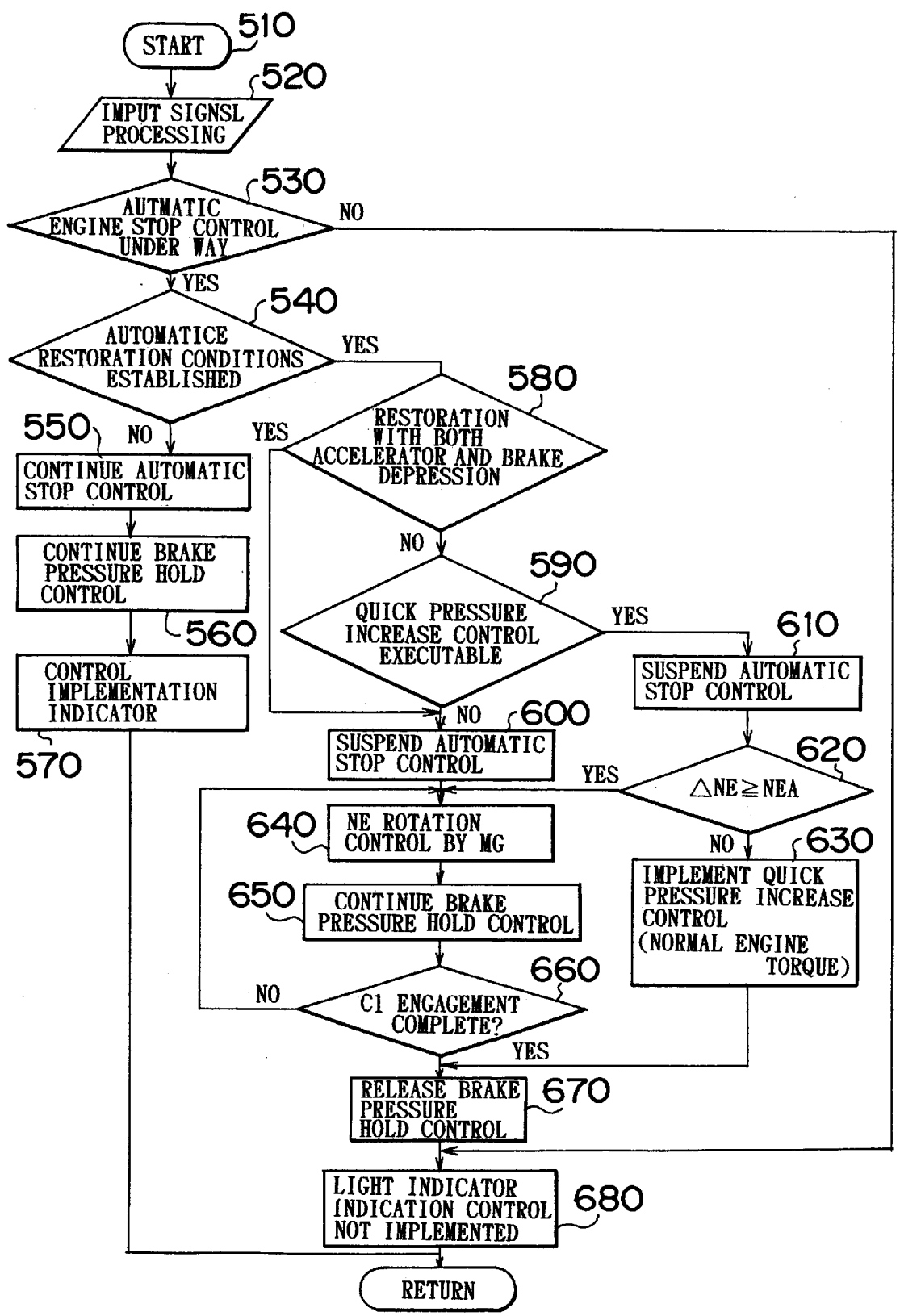
FIG. 11 is a flow chart showing a control according to a different embodiment of the automatic engine stop control of a vehicle according to the present invention.

Next, the torque-down control in the present embodiment will be described with reference to FIG. 1 and FIG. 11. FIG. 1 and FIG. 11 are flowcharts indicating contents of a sub-routine processing that is carried out from the automatic stop of the engine to the restart thereof. The following description will be made with reference to these flowcharts.

FIG. 1 is a flowchart showing the control flow wherein the engine torque TE is directly reduced by controlling the combustion state of the engine, whereas FIG. 11 is a flowchart indicating a flow wherein the engine speed NE is reduced by the motor generator 3, reducing the engine torque as a result. Furthermore, as mentioned earlier, the torque-down of the engine may be implemented by reducing (suppressing) the engine speed NE.

Upon entering the sub-routine for restarting the engine in FIG. 1, first of all, various processings for input signals are performed (in step 320). Then, it is determined in step 330 whether or not the engine has been stopped automatically. If the engine has not been stopped automatically, the process returns to the main routine after lighting an indicator (step 450) indicating that the engine has not been automatically stopped.

If the engine has been stopped automatically, it is determined in step 340 whether or not the conditions for automatically restoring (restarting) the engine are met. The restart conditions for the engine 1 are as mentioned earlier. Here, if the restart conditions of the engine 1 are not met, the automatic stop control of the engine 1 is continued (step 350). At that time, the brake pressure hold electromagnetic valve 228, described in FIG. 8, continues confining the brake pressure (step 360), then an indicator indicating that the engine has been automatically stopped is lit (step 370), and the process is returned.

In step 340, if restart conditions for the engine 1 are met, the process proceeds to step 380, and it is determined whether it is a state where the quick pressure increase control is possible. The determination of whether it is a state where the quick pressure increase control is possible is that mentioned earlier.

In step 380, if it is determined that it is a "state where the quick pressure increase control is executable," an ordinary restart processing is executed. That is, the process proceeds to step 420 to suspend the automatic stop control of the engine (after the engine restart command), and the quick pressure increase control is executed (step 430). After executing the quick pressure increase control, the brake pressure control is released and the vehicle is in a state capable of immediately taking off. During this time, the engine torque is not reduced (as normal).

On the other hand, if it is determined in step 380 that it is a "state where the quick pressure increase control in non-executable," the process proceeds to step 390 and the automatic stop control of the engine 1 is suspended (after restart). Then the engine torque TE is reduced, as compared to the case where the quick pressure increase control is executable (step 400), using such methods as mentioned earlier. At this time, the brake pressure hold control is continued by the brake pressure hold electromagnetic valve 228 (step 410), and the process proceeds to step 450 after the engagement of the forward clutch C1 is has been completed (or estimated to be complete) (step 415) and the brake pressure hold control is released.

If it is determined in step 380 that it is a "state where the quick pressure increase control is executable," ordinary restart processing is implemented. That is, the process proceeds to step 420 to suspend the automatic stop control of the engine (after engine restart command), and the quick pressure increase control is executed (step 430). After executing the quick pressure increase control, the brake pressure control is released in step 440 so that the vehicle is in a state capable of immediately taking off. During this time, the engine torque is not reduced (normal).

On the other hand, if it is determined in step 380 that it is a "state where the quick pressure increase control in non-executable," the process proceeds to step 390 and the automatic stop control of the engine 1 is suspended (after restart). Then the engine torque TE is reduced, using such methods as mentioned earlier, as compared to the case where the quick pressure increase control is executable (step 400). At this time, the brake pressure hold control is continued by the brake pressure hold electromagnetic valve 228 (step 410), and the process proceeds to step 440 after the engagement of the forward clutch C1 is complete (or estimated to be complete) (step 415).

If the automatic stop control of the engine is suspended (the engine has been restarted), regardless of whether the quick pressure increase control has been executed or not, an indicator indicating that the automatic stop control of the engine 1 has not been executed is lit in step 450, and the process is returned.

Next, a flow of reducing the engine speed NE in FIG. 11 will be explained. Because the steps 510 to 570 are the same as the steps 310 to 370 in FIG. 1, the explanation thereof will be omitted here.

In step 540, when the restart conditions of the engine 1 are met, the process proceeds to step 540 and it is detected whether the brake and the accelerator pedals are depressed simultaneously (depressing of both the brake and the accelerator pedals will be hereinafter referred to as "both depression"). If it is determined that the both depression has been implemented, the engine speed rises before the hydraulic pressure supplied to the forward clutch C1 rises. This puts the forward clutch C1 in the most harsh state time-wise as well.

In step 580, if it is determined that both the brake and the accelerator pedals have not been depressed, the process proceeds to step 590, and it is determined whether it is a state where the quick pressure increase control is executable. In step 590, if it is determined that it is a "state where the quick pressure increase control is executable," the automatic stop control of the engine is suspended (step 610), and ordinary restart processing is carried out.

At that time, in the present embodiment, it is determined whether the change rate DNE of the engine speed NE is greater than the predetermined value NEA (step 620). This is because, in the case where the change rate DNE of the engine speed is determined to be greater than the predetermined value NEA, there is a possibility of the engine over-revving due to the engagement of the forward clutch C1 being not completed on time.

If it is determined in step 620 that the change rate DNE of the engine speed is less than the predetermined value NEA, the process proceeds to step 630, and the quick pressure increase control is implemented. After executing the quick pressure increase control, the brake pressure control is released so that the vehicle is in a state capable of immediately taking off (step 670). During this time, the engine torque TE and the engine speed NE are not reduced (as normal).

On the other hand, if it is determined in step 590 that it is a "state where the quick pressure increase control is non-executable," the process proceeds to step 600 to suspend the automatic stop control of the engine 1 (after restart). Then, the engine speed NE is controlled by the motor generator 3 as compared to the case where the quick pressure increase control is executable. While reducing the engine torque thus, the hydraulic pressure is supplied to the forward clutch C1 (step 640).

Further, the reduction of engine torque may be carried out in combination with the retardation of ignition timing of the engine.

Also, at this time, the brake pressure hold control is continued by the brake pressure hold electromagnetic valve 228 (step 650), and the process proceeds to step 670 after the engagement of the forward clutch C1 is complete (or estimated to be complete) (step 660).

When the engagement of the forward clutch C1 has terminated, the brake pressure control is released and the vehicle is put in a state capable of immediately taking off (step 670). When the automatic stop control of the engine is suspended (restarted), regardless of whether the quick pressure increase control had been executed or not, an indicator indicating that the automatic stop control of the engine 1 has not been implemented is lit in step 680, and the process is returned.

While the present invention has been described with reference to what are presently considered to be preferred embodiments thereof, it is to be understood that the invention is not limited to the disclosed embodiments or constructions. To the contrary, the invention is intended to cover various modifications and equivalent arrangements included within the spirit and scope of the invention.

What is claimed is:

1. A control device for restarting an engine of a vehicle, comprising:
    an engine restart device connected to the engine so as to restart the engine when the engine is stopped and predetermined restart conditions are met;
    a predetermined clutch engaged by oil supplied to said clutch, and connected to the engine so as to transmit torque outputted from the engine;
    a hydraulic control device connected to the predetermined clutch so as to execute a quick pressure increase control which quickly supplies oil temporarily to the clutch at an initial stage of hydraulic pressure supply to the clutch;
    a determination device which determines whether the quick pressure increase control is executable; and
    a torque-down control device for reducing the engine torque, as compared to a case where the quick pressure increase control is possible, when it is determined by the determination device that the quick pressure increase control is non-executable.

2. The control device according to claim 1, wherein the determination device includes a fail detector for detecting a failure of the hydraulic control device and which determines that the quick pressure increase control is non-executable when failure of the hydraulic control device is detected by the fail detector.

3. The control device according to claim 1, wherein the hydraulic control device comprises:
    a hydraulic source for generating hydraulic pressure in an oil passage communicating with a predetermined clutch, and
    a hydraulic adjusting device disposed between the predetermined clutch and the hydraulic source, for adjusting an amount of oil supplied to the predetermined clutch according to operation signal values transmitted to the hydraulic adjusting device,
    wherein the determination device determines whether the quick pressure increase control is executable according to a change in the operation signal values transmitted to the hydraulic adjusting device.

4. The control device according to claim 1, wherein upon engaging the predetermined clutch, the torque-down control device changes the engine torque to a value equivalent to that when the engine speed is at idle and maintains that same constant value of the engine torque when the quick pressure increase control is non-executable.

5. The control device according to claim 1, further comprising a detector for detecting whether the clutch is engaged, wherein reduction of the engine torque by the torque-down control device is terminated when the engagement of the clutch is detected.

6. The control device according to claim 1, wherein the hydraulic control device executes the quick pressure increase control when a predetermined time has elapsed after restart of the engine.

7. The control device according to claim 1 further comprising a braking force maintaining device for maintaining a braking force of a vehicle, wherein the braking force maintaining device maintains the braking force until the predetermined clutch is engaged in the case where the engine is restarted in a state with reduced engine torque.

8. The control device according to claim 1 wherein the torque-down control device comprises:

an ignition device for igniting a fuel-air mixture in a cylinder of the engine and an ignition timing control device for controlling the ignition timing by the ignition device, wherein the torque-down control of the engine is carried out by retarding the ignition timing of the ignition device from an optimum ignition timing by the ignition timing control device.

9. The control device according to claim 1 wherein the torque-down control device comprises:

a throttle valve for controlling an intake amount of the engine and a throttle valve opening degree control device for controlling an opening degree of the throttle valve, wherein the torque-down control of the engine is implemented by controlling the opening degree of the throttle valve by the opening degree control device to a narrower level than an ordinary opening degree corresponding to an amount of accelerator depression.

10. The control device according to claim 1 wherein the torque-down control device implements the torque-down control by suppressing the rotational speed of the engine.

11. A control device for restarting an engine of a vehicle, comprising:

engine restart means for restarting the engine when the engine is stopped and predetermined restart conditions are met;

a predetermined clutch engaged by oil supplied to said clutch, and connected to the engine so as to transmit torque outputted from the engine;

hydraulic control means for executing a quick pressure increase control which quickly supplies oil temporarily to the clutch at an initial stage of hydraulic pressure supply to the clutch;

determination means for determining whether the quick pressure increase control is executable; and torque-down control means for reducing the engine torque, as compared to a case where the quick pressure increase control is possible, when it is determined by the determination means that the quick pressure increase control is non-executable.

12. The control device according to claim 11, wherein the determination means includes fail detector means for detecting a failure of the hydraulic control means and for determining that the quick pressure increase control is non-executable when failure of the hydraulic control means is detected by the fail detector means.

13. The control device according to claim 11, wherein the hydraulic control means comprises:

a hydraulic source for generating hydraulic pressure in an oil passage communicating with a predetermined clutch, and hydraulic adjusting means for adjusting an amount of oil supplied to the predetermined clutch according to operation signal values transmitted to the hydraulic adjusting means, wherein the determination means determines whether the quick pressure increase control is executable according to a change in the operation signal values transmitted to the hydraulic adjusting means.

14. The control device according to claim 11, wherein upon engaging the predetermined clutch, the torque-down control means changes the engine torque to a value equivalent to that when the engine speed is at idle and maintains that same constant value of the engine torque when the quick pressure increase control is non-executable.

15. The control device according to 11, further comprising detector means for detecting whether the clutch is engaged, wherein reduction of the engine torque by the torque-down control means is terminated when the engagement of the clutch is detected.

16. The control device according to claim 11, wherein the hydraulic control means executes the quick pressure increase control when a predetermined time has elapsed after restart of the engine.

17. The control device according to claim 11 further comprising braking force maintaining means for maintaining a braking force of a vehicle, wherein the braking force maintaining means maintains the braking force until the predetermined clutch is engaged in the case where the engine is restarted in a state with reduced engine torque.

18. The control device according to claim 11 wherein the torque-down control means comprises:

ignition means for igniting a fuel-air mixture in a cylinder of the engine and ignition timing control means for controlling the ignition timing by the ignition means, wherein the torque-down control of the engine is carried out by retarding the ignition timing of the ignition means from an optimum ignition timing by the ignition timing control means.

19. The control device according to claim 11 wherein the torque-down control device comprises:

a throttle valve for controlling an intake amount of the engine and a throttle valve opening degree control means for controlling an opening degree of the throttle valve, wherein the torque-down control of the engine is implemented by controlling the opening degree of the throttle valve by the opening degree control means to a narrower level than an ordinary opening degree corresponding to an amount of accelerator depression.

20. The control device according to claim 11 wherein the torque-down control is implemented by suppressing the rotational speed of the engine by the torque-down control means.

* * * * *